(12) United States Patent
Chen

(10) Patent No.: US 8,655,161 B1
(45) Date of Patent: Feb. 18, 2014

(54) WIRELESS IMAGE TRANSMISSION DEVICE

(71) Applicant: Yung-Chien Chen, Taoyuan County (TW)

(72) Inventor: Yung-Chien Chen, Taoyuan County (TW)

( * ) Notice: Subject to any disclaimer, the term of this patent is extended or adjusted under 35 U.S.C. 154(b) by 0 days.

(21) Appl. No.: 13/660,069

(22) Filed: Oct. 25, 2012

(51) Int. Cl.
*G03B 17/14* (2006.01)

(52) U.S. Cl.
USPC ............................... 396/56; 396/529; 396/533

(58) Field of Classification Search
USPC ............ 396/56, 529, 533; 348/211.2, 211.14, 348/360; 359/827–829
See application file for complete search history.

(56) References Cited

U.S. PATENT DOCUMENTS

| | | | |
|---|---|---|---|
| 5,678,096 A * | 10/1997 | Wakabayashi et al. | 396/348 |
| 2004/0062545 A1 * | 4/2004 | Ushiro | 396/529 |
| 2006/0061663 A1 * | 3/2006 | Park | 348/211.2 |
| 2006/0088314 A1 * | 4/2006 | Matsushita et al. | 396/529 |
| 2007/0077062 A1 * | 4/2007 | Senba et al. | 396/529 |
| 2007/0086778 A1 * | 4/2007 | Tanaka | 396/529 |

\* cited by examiner

*Primary Examiner* — WB Perkey
(74) *Attorney, Agent, or Firm* — Rosenberg, Klein & Lee

(57) ABSTRACT

The present invention provides a wireless image transmission device, which includes a lens body which a lens is mounted. The lens body includes a transmitter unit that includes an encoder functioning to provide an encoded signal of wirelessly transmitted images. The lens body has an end forming a first connection section. An electronic device includes a control unit electrically connected to a receiver unit that includes a decoder functioning to wirelessly receive and convert the encoded signal of images from the transmitter unit into a decoded image signal to be applied to the control unit. The electronic device has an end forming a second connection section. The second connection section is connectable to the first connection section of the lens body. When the lens body is separated from the electronic device, the electronic device can receive image taken by the lens body in a wireless manner.

9 Claims, 10 Drawing Sheets

WIRELESS IMAGE TRANSMISSION DEVICE

FIELD OF THE INVENTION

The present invention relates to a wireless image transmission device, and in particular to a structure that allows a lens body to be separate from and re-mounted to an electronic device, wherein the lens body comprises a transmitter unit and the electronic device comprises a receiver unit so that when the lens body is separate from the electronic device, the electronic device may receive, in a wireless manner, images taken by the lens body.

BACKGROUND OF THE INVENTION

The development of science and technology allows various electronic devices (such as mobile phones, smart phones, and tablet computers) to be combined with an image photographing function, in addition to the ordinary digital cameras and camcorders that are commonly used to shoot pictures or to photograph.

These electronic devices are structured to embed a lens in a device body so that the lens can be used to take images. However, there are drawbacks:

(1) Although the electronic device is provided with a lens, a user must properly hold the electronic device with hands to effect focusing and photographing. This imposes a limitation to photographing distance.

(2) The lens is fixed to the electronic device and is electrically connected a control circuit internally of the electronic device. This makes it impossible to remove the lens from the electronic device.

(3) After being removed, the lens cannot serve as a stand-along device and is incapable of wireless transmission of images.

In view of these problems, the present invention aims to provide a wireless image transmission device that comprises a structure that allows a lens body to be separated from an electronic device and the lens body comprises a transmitter unit and the electronic device comprises a receiver unit so that when the lens body is separate from the electronic device, the electronic device may receive, in a wireless manner, images taken by the lens body.

SUMMARY OF THE INVENTION

An object of the present invention is to provide a wireless image transmission device, which comprises a structure that allows a lens body and an electronic device to selectively separate from or couple to each other, wherein the lens body comprises a transmitter unit and the electronic device comprises a receivers unit so that wireless transmission of images can be effected, whereby when the lens body is separate from the electronic device, the electronic device can receive images taken by the lens body in a wireless manner.

To realize the above object, the present invention provides a wireless image transmission device, which comprises a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body. As such, when the lens body is separate from the electronic device, the electronic device can receive images taken by the lens body in a wireless manner.

For better understanding of the features, advantages, and technical contents of the present invention, reference will be made to the following detailed description and accompanying drawings. However, it is noted that such drawings are provided for illustration only and are not intended to impose limitation to the scope of the present invention.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

First Embodiment

Figure 1:
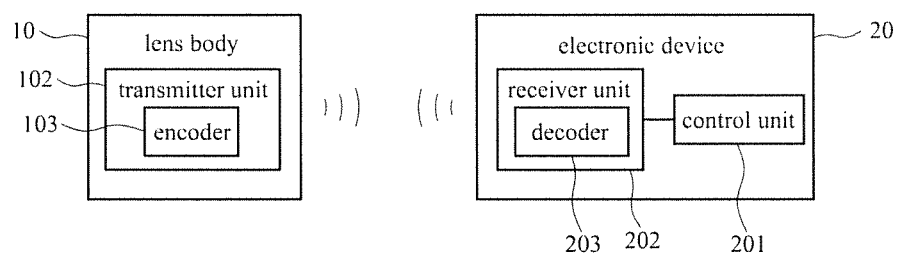
FIG. 1 is a block diagram of the present invention.
Figure 2:
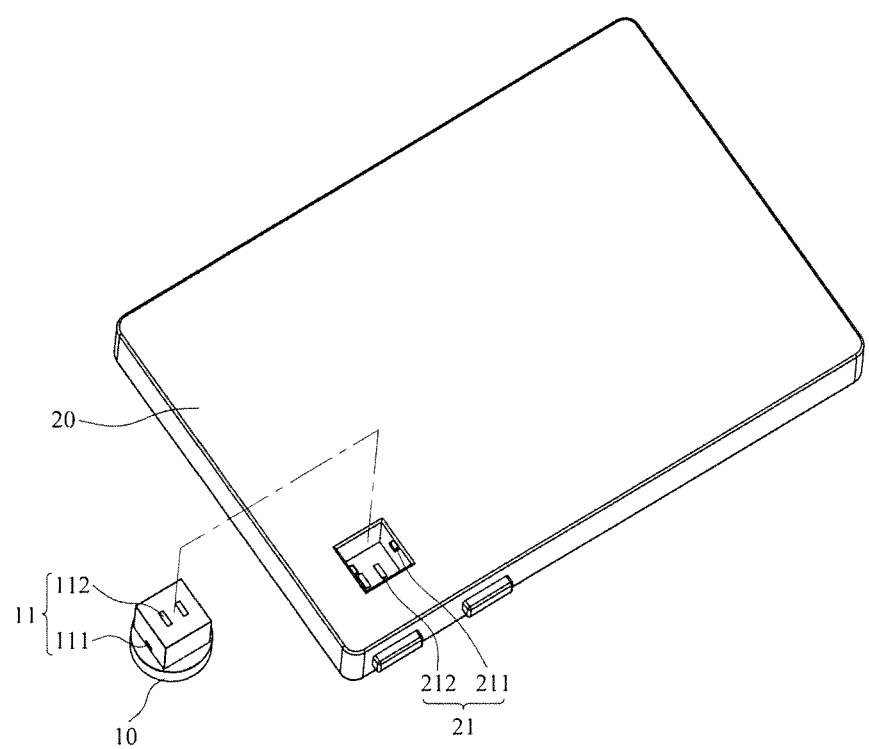
FIG. 2 is an exploded view showing a first embodiment according to the present invention.
Figure 3:
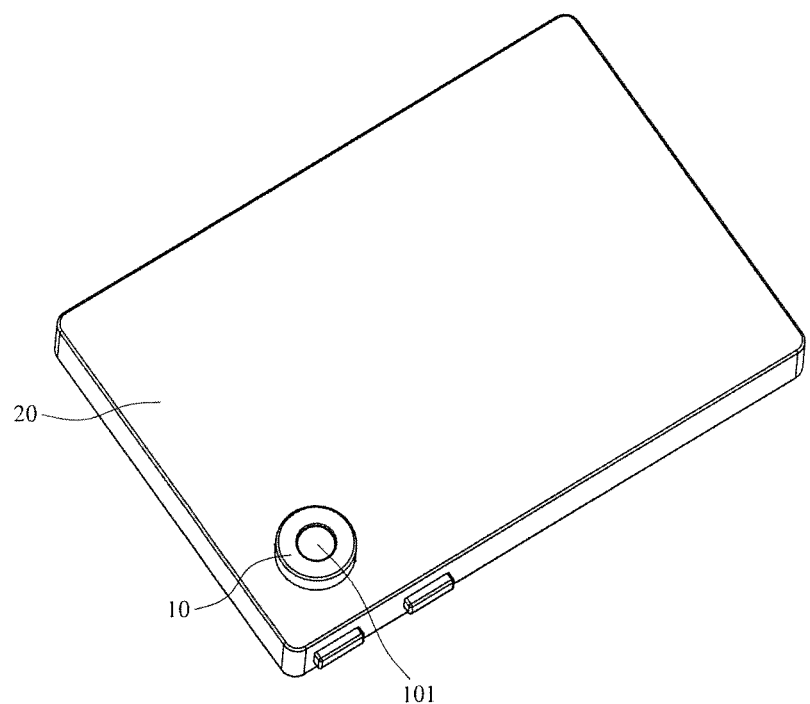
FIG. 3 is an assembled view of the first embodiment of the present invention.
Figure 4:
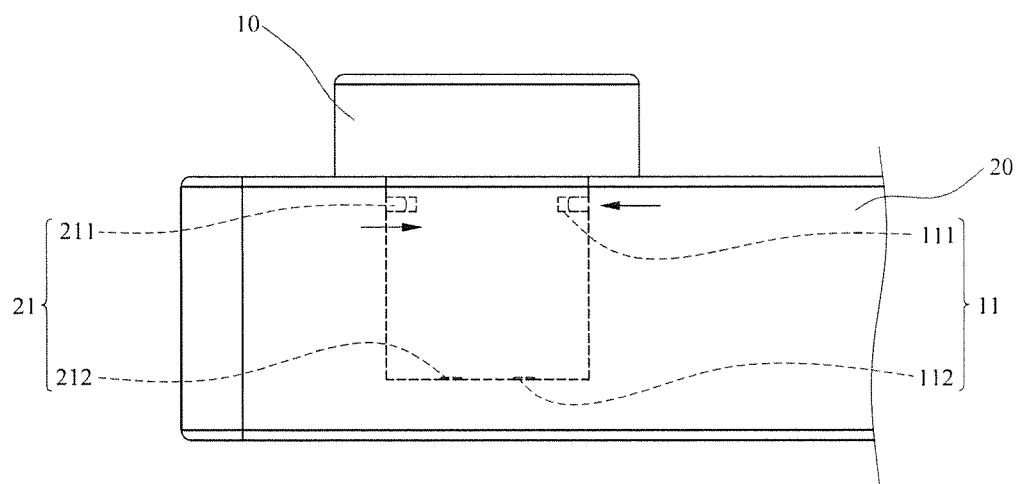
FIG. 4 is a schematic view illustrating the assembly of the first embodiment of the present invention.
Figure 5:
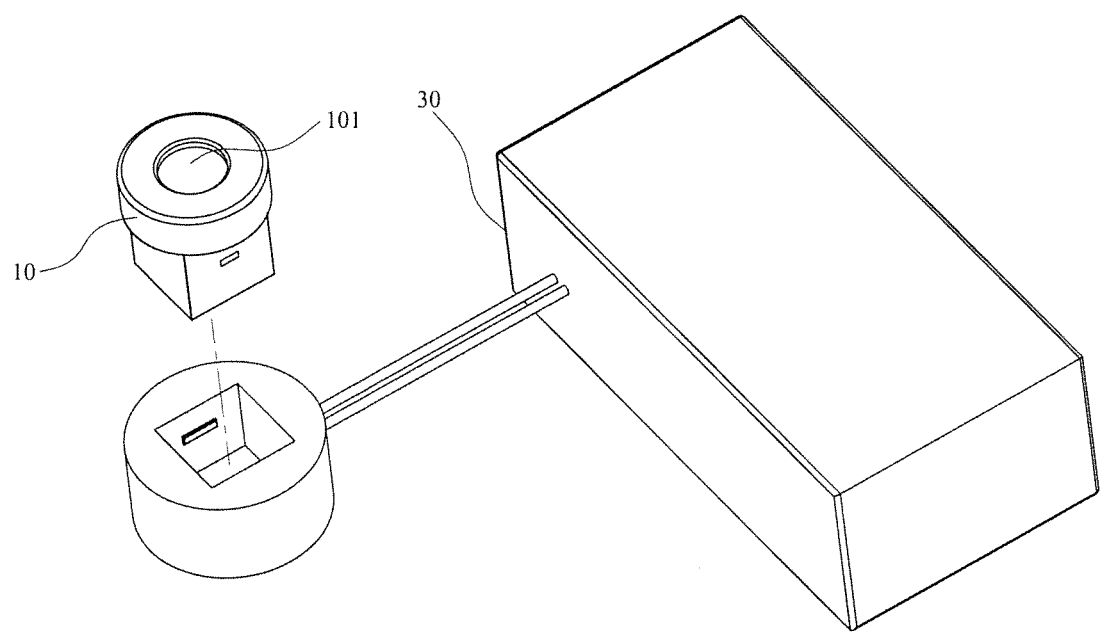
FIG. 5 is a perspective view illustrating the use of the lens body in a separate condition according to the first embodiment of the present invention.

With reference to the drawings and in particular to FIGS. 1-5, a wireless image transmission device comprises a lens body 10, to which a lens 101 is mounted. The lens body 10 comprises a transmitter unit 102 mounted therein. The transmitter unit 102 comprises an encoder 103. The encoder 103 functions to provide an encoded signal of wirelessly transmitted images. The lens body 10 has an end forming a first connection section 11. An electronic device 20 comprises a control unit 201 and a receiver unit 202. The control unit 201 is electrically connected to a receiver unit 202. The receiver unit 202 comprises a decoder 203. The decoder 203 functions to wirelessly receive and convert the encoded signal of images from the transmitter unit into a decoded image signal and transmit the decoded image signal to the control unit 201. The electronic device 20 has an end forming a second connection section 21. The second connection section 20 is connectable to the first connection section 11 of the lens body 10. The electronic device 20 can be either one of a mobile phone, a smart phone, a tablet computer, and a digital camera.

The first connection section 11 has two opposite sides on each of which an engagement recess 111 is formed. The first connection section 11 has a bottom forming a positive/negative electrode terminal 112. The second connection section 21 has two opposite inside surfaces each of which forms an engagement projection 211. The second connection section 21 has a bottom forming a positive/negative electrode coupling section 212. With the engagement projections 211 of the second connection section 21 respectively received in the engagement recesses 111 of the first connection section 11, the positive/negative electrode coupling section 212 of the second connection section 21 engages and is connected to the positive/negative electrode terminal 112 of the first connection section 11.

The lens body 10 is separable from the electronic device 20. When the lens body 10 is separated, the lens body 10 is electrically connectable to a power supply unit 30 (see FIG. 5). The power supply unit 30 can be a battery. Further, the lens body 10 comprises an antenna (not shown), whereby the antenna helps extending the distance of wirelessly transmitting encoded image signals of the lens body 10. As such, the first connection section 11 of the lens body 10 and the second connection section 21 of the electronic device 20 provide a function of separation or coupling and when the lens body 10 is separated, the electronic device 20 can receive image taken by the lens body 10 in a wireless manner.

Second Embodiment

Figure 6:
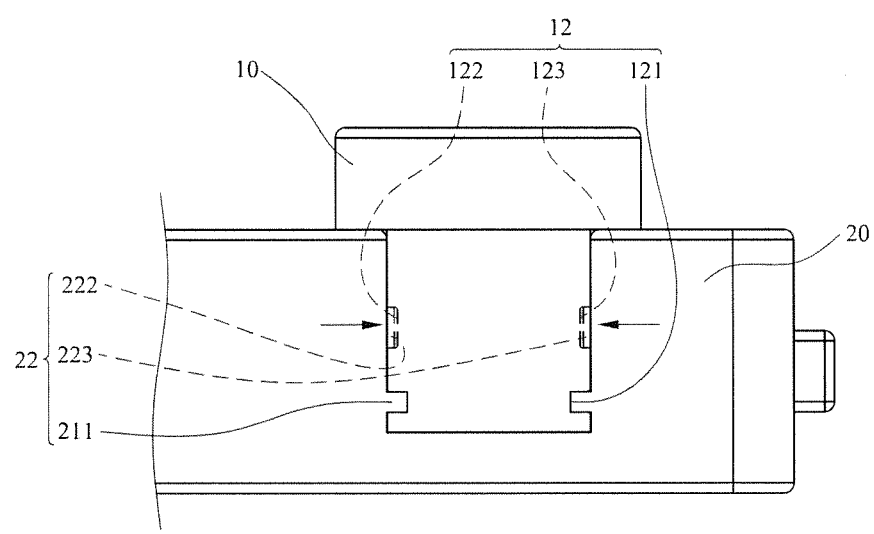
FIG. 6 is a schematic view illustrating the assembly of a second embodiment of the present invention.

Referring to FIG. 6, with additional reference to FIG. 1-5, the second embodiment is different from the first embodiment in that the solution of separation and coupling between the lens body 10 and the electronic device 20 is different. Repeated description will be omitted herein. In FIG. 6, the first connection section 12 has two sides each of which forms a slide channel 121. Further, the first connection section 12 forms on one side thereof a positive electrode engagement recess section 122 and the first connection section 12 also forms on another side thereof a negative electrode engagement recess section 123. The second connection section 22 has two inside surfaces each forming a slide rail 221. The second connection section 22 forms in one inside surface thereof a positive electrode engagement projection section 222 and the second connection section 22 forms in another inside surface thereof a negative electrode engagement projection section 223. With the slide rails 221 respectively mating the slide channels 121, the positive electrode engagement recess section 122 is set in engagement with the positive electrode engagement projection section 222 and the negative electrode engagement recess section 123 is set in engagement with the negative electrode engagement projection section 223. Further, the positive electrode engagement projection section 222 and the negative electrode engagement projection section 223 are movable for easy positioning in effecting coupling or separation. As such, with the second embodiment, the first connection section 12 of the lens body 10 and the second connection section 22 of the electronic device 20 provide a function of separation or coupling and when the lens body 10 is separated, the electronic device 20 can receive image taken by the lens body 10 in a wireless manner.

Third Embodiment

Figure 7:
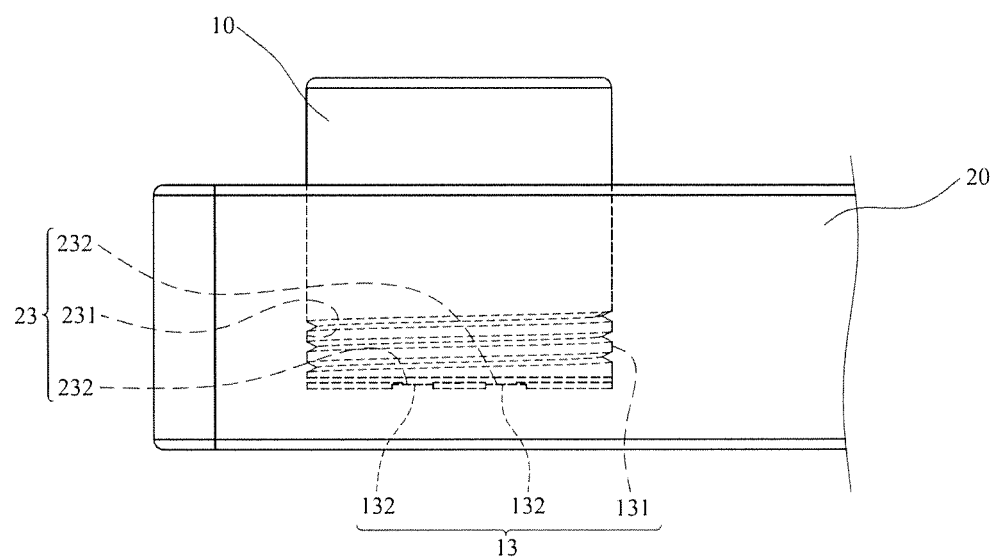
FIG. 7 is a schematic view illustrating the assembly of a third embodiment of the present invention.

Referring to FIG. 7, with additional reference to FIG. 1-5, the second embodiment is different from the first embodiment in that the solution of separation and coupling between the lens body 10 and the electronic device 20 is different. Repeated description will be omitted herein. In FIG. 7, the first connection section 13 has an outer circumference forming a male thread 131 and the first connection section 13 has a bottom forming a positive/negative electrode terminal 132. The second connection section 23 has an inside surface forming a female thread 231 and the second connection section 23 has a bottom forming a positive/negative electrode coupling section 132. With the male thread 131 of the first connection section 13 engaging the female thread 231 of the second connection section 23, the positive/negative electrode terminal 132 of the first connection section 13 is coupled to the positive/negative electrode coupling section 132 of the second connection section 23. As such, with the third embodiment, the first connection section 13 of the lens body 10 and the second connection section 23 of the electronic device 20 provide a function of separation or coupling and when the lens body 10 is separated, the electronic device 20 can receive image taken by the lens body 10 in a wireless manner.

Fourth Embodiment

Figure 8:
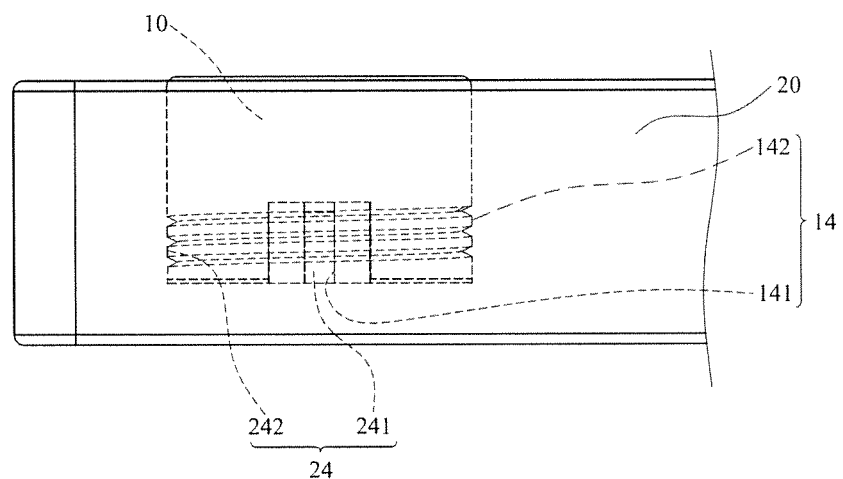
FIG. 8 is a schematic view illustrating the assembly of a fourth embodiment of the present invention.

Referring to FIG. 8, with additional reference to FIG. 1-5, the second embodiment is different from the first embodiment in that the solution of separation and coupling between the lens body 10 and the electronic device 20 is different. Repeated description will be omitted herein. In FIG. 8, the first connection section 14 comprises a positive electrode section 141 and a negative electrode threading section 142. The positive electrode section 141 is formed at a center of bottom of the first connection section 14. The second connection section 24 comprises a positive electrode coupling section 241 and a negative electrode threading coupling section 242. The positive electrode coupling section 241 is formed at a center of bottom of the second connection section 24. With the negative electrode threading section 142 of the first connection section 14 engaging the negative electrode threading coupling section 242 of the second connection section 24, the positive electrode section 141 is set in engagement with the positive electrode coupling section 241. As such, with the fourth embodiment, the first connection section 14 of the lens body 10 and the second connection section 24 of the electronic device 20 provide a function of separation or coupling and when the lens body 10 is separated, the electronic device 20 can receive image taken by the lens body 10 in a wireless manner.

Fifth Embodiment

Figure 9:
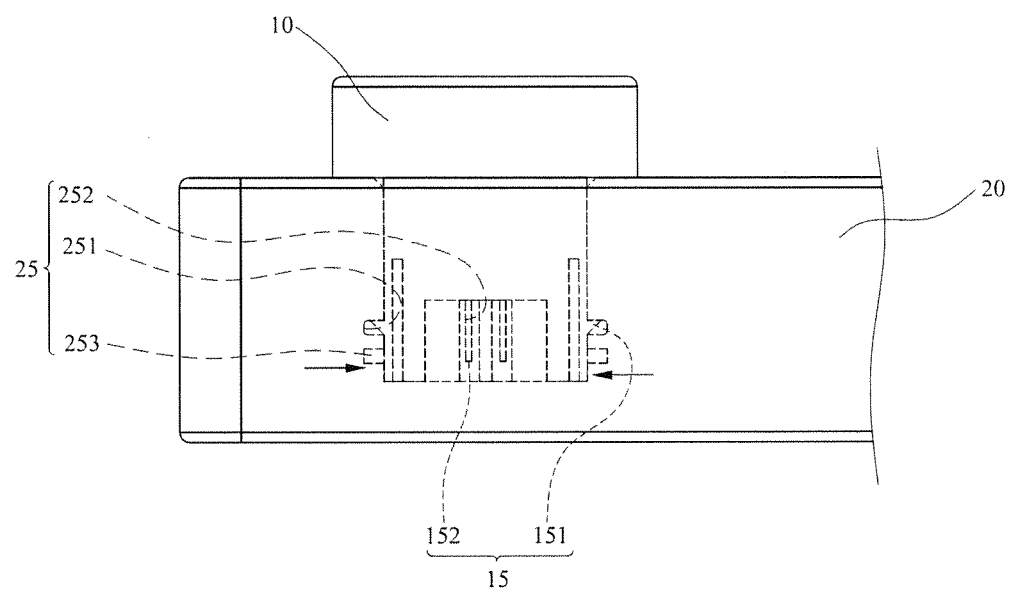
FIG. 9 is a schematic view illustrating the assembly of a fifth embodiment of the present invention.
Figure 10:
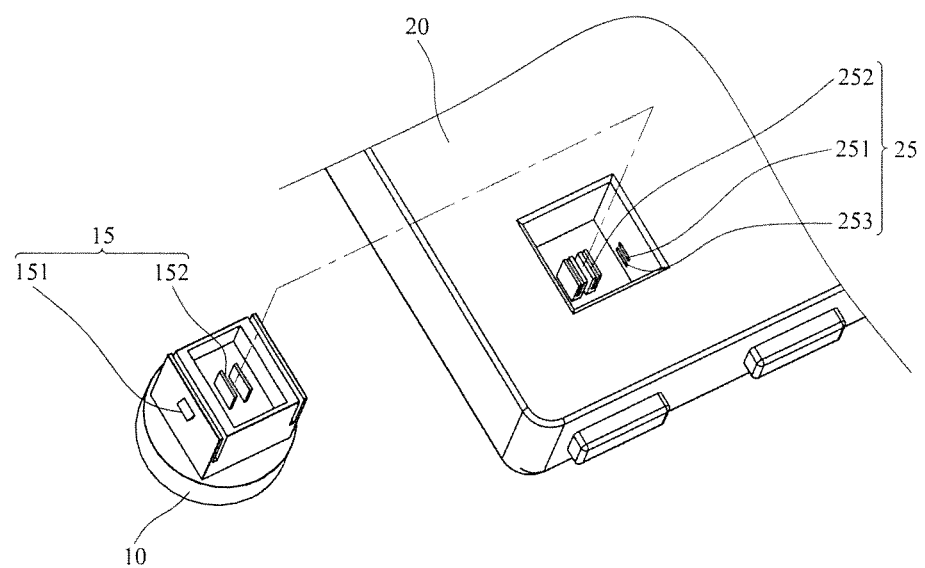
FIG. 10 is an exploded view of the fifth embodiment of the present invention.

Referring to FIGS. 9 and 10, with additional reference to FIG. 1-5, the second embodiment is different from the first embodiment in that the solution of separation and coupling between the lens body 10 and the electronic device 20 is different. Repeated description will be omitted herein. In FIG. 9, the first connection section 15 has two opposite sides each forming a resilient retention plate 151 and the first connection section 15 has a bottom forming a positive/negative electrode connector 152. The second connection section 25 has opposite inside surfaces each forming a retention slot 251 and the second connection section 25 has a bottom forming a positive/negative electrode connector coupling section 252. With the resilient retention plates 151 of the first connection section 15 respectively engaging the retention slots 251 of the second connection section 25, the positive/negative electrode connector 152 is set into engagement with the positive/negative electrode connector coupling section 252. Further, the second connection section 25 of the electronic device 20 forms a push block 253 on each of the two inside surfaces thereof. The push blocks 253 are respectively provided at one side of the retention slots 251. By inward depressing the push blocks 253, the resilient retention plates 151 of the first connection section 15 are retracted backward to allow the first connection section 15 to separate from the second connection section 25. As such, with the fifth embodiment, the first connection section 15 of the lens body 10 and the second connection section 25 of the electronic device 20 provide a function of separation or coupling and when the lens body 10 is separated, the electronic device 20 can receive image taken by the lens body 10 in a wireless manner.

In summary, the features of the present invention are briefed as follows.

(1) The present invention uses the first connection section of the lens body and the second connection section of the electronic device to carry out selective coupling and separation and when the lens body is separate from the electronic device, the transmitter unit of the lens body and the receiver unit of the electronic device can carry out wireless transmission of images so that the electronic device may wirelessly receive the images taken by the lens body.

(2) The wireless image transmission device of the present invention is applicable to various electronic devices, wherein the electronic device can be either a mobile phone, a smart phone, a tablet computer, a notebook computer, or a digital camera so as to diversify the application thereof and after the lens body is detached and separated, images can be wirelessly transmitted therefrom to the electronic device.

(3) The present invention provides a lens body and an electronic device, which comprise a first connection section and second connection section that are engageable with each other and the first connection section and the second connection section can be embodied in various forms as illustrated in the above first to fifth embodiments, so as to achieve easy coupling or separation between the electronic device and the lens body.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wireless image transmission device, comprising:
a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and
an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body, wherein the first connection section has two opposite sides on each of which an engagement recess is formed, the first connection section having a bottom forming a positive/negative electrode terminal, the second connection section having two opposite inside surfaces each of which forms an engagement projection, the second connection section having a bottom forming a positive/negative electrode coupling section, whereby with the engagement projections of the second connection section respectively received in the engagement recesses of the first connection section, the positive/negative electrode coupling section of the second connection section engages and is connected to the positive/negative electrode terminal of the first connection section.

2. A wireless image transmission device, comprising:
a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and
an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body, wherein the first connection section has two sides each of which forms a slide channel, the first connection section forming on one side thereof a positive electrode engagement recess section and the first connection section also forming on another side thereof a negative electrode engagement recess section, the second connection section having two inside surfaces each forming a slide rail, the second connection section forming in one inside surface thereof a positive electrode engagement projection section and the second connection section forming in another inside surface thereof a negative electrode engagement projection section, whereby with the slide rails respectively mating the slide channels, the positive electrode engagement recess section is set in engagement with the positive electrode engagement projection section and the negative electrode engagement recess section is set in engagement with the negative electrode engagement projection section.

3. A wireless image transmission device, comprising:
a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and
an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body, wherein the first connection section has an outer circumference forming a male thread and the first connection section has a bottom forming a positive/negative electrode terminal, the second connection section having an inside surface forming a female thread, the second connection section having a bottom forming a positive/negative electrode coupling section, whereby with the male thread of the first connection section engaging the female thread of the second connection section, the positive/negative electrode terminal of the first connection section is coupled to the positive/negative electrode coupling section of the second connection section.

4. A wireless image transmission device, comprising:
a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and
an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body, wherein the first connection section comprises a positive electrode section and a negative electrode threading section, the positive electrode section being formed at a center of bottom of the first connection section, the second connection section comprising a positive electrode coupling section and a negative electrode threading coupling section, the positive electrode coupling section being formed at a center of bottom of the second connection section, whereby with the negative electrode threading section of the first connection section engaging the negative electrode threading coupling section of the second connection section, the positive electrode section is set in engagement with the positive electrode coupling section.

5. A wireless image transmission device, comprising:
a lens body, to which a lens is mounted, the lens body comprising a transmitter unit mounted therein, the transmitter unit comprising an encoder, the encoder functioning to provide an encoded signal of wirelessly transmitted images, the lens body having an end forming a first connection section; and
an electronic device, which comprises a control unit and a receiver unit, the control unit being electrically connected to a receiver unit, the receiver unit comprising a decoder, the decoder functioning to wirelessly receive and convert the encoded signal of images from the transmitter unit into a decoded image signal and transmit the decoded image signal to the control unit, the electronic device having an end forming a second connection section, the second connection section being connectable to the first connection section of the lens body, wherein the first connection section has two opposite sides each forming a resilient retention plate and the first connection section has a bottom forming a positive/negative electrode connector, the second connection section having opposite inside surfaces each forming a retention slot, the second connection section having a bottom forming a positive/negative electrode connector coupling section, whereby with the resilient retention plates of the first connection section respectively engaging the retention slots of the second connection section, the positive/negative electrode connector is set into engagement with the positive/negative electrode connector coupling section.

6. The wireless image transmission device as claimed in claim 1, wherein the lens body is separable from the electronic device and the lens body is electrically connectable to a power supply unit.

7. The wireless image transmission device as claimed in claim 6, wherein the power supply unit comprises a battery.

8. The wireless image transmission device as claimed in claim 1, wherein the lens body comprises an antenna.

9. The wireless image transmission device as claimed in claim 1, wherein the electronic device is selected from a group consisting of a mobile phone, a smart phone, a tablet computer, a notebook computer, and a digital camera.

* * * * *